United States Patent
Ling et al.

(10) Patent No.: US 12,362,977 B2
(45) Date of Patent: Jul. 15, 2025

(54) METHOD AND APPARATUS FOR PT-RS MAPPING

(71) Applicant: Lenovo (Beijing) Ltd., Beijing (CN)

(72) Inventors: Wei Ling, Changping (CN); Chenxi Zhu, Haidian District (CN); Bingchao Liu, Changping District (CN); Lingling Xiao, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 504 days.

(21) Appl. No.: 17/775,305

(22) PCT Filed: Nov. 8, 2019

(86) PCT No.: PCT/CN2019/116690
§ 371 (c)(1),
(2) Date: May 8, 2022

(87) PCT Pub. No.: WO2021/087975
PCT Pub. Date: May 14, 2021

(65) Prior Publication Data
US 2022/0400041 A1 Dec. 15, 2022

(51) Int. Cl.
*H04L 27/26* (2006.01)
*H04L 5/00* (2006.01)
*H04L 25/02* (2006.01)

(52) U.S. Cl.
CPC ........ *H04L 27/2613* (2013.01); *H04L 5/0048* (2013.01); *H04L 25/0224* (2013.01)

(58) Field of Classification Search
CPC ............... H04L 27/2613; H04L 5/0048; H04L 25/0224; H04L 27/2602; H04L 5/0051;
(Continued)

(56) References Cited

U.S. PATENT DOCUMENTS 11,128,428 B2 * 9/2021 Frenne .................. H04L 5/0037
11,528,108 B2 * 12/2022 Lee ........................ H04L 5/0035
(Continued)

FOREIGN PATENT DOCUMENTS

WO    2019160379 A1    8/2019

OTHER PUBLICATIONS

AT&T, "Remaining Issues in Multi TRP Transmission", 3GPP TSG RAN WG1 #97, R1-1907171, Reno, USA [retrieved Jul. 7, 2022]. Retrieved from the Internet <https://www.3gpp.org/ftp/tsg_ran/WG1_RL1/TSGR1_97/Docs>, May 2019, 21 pages.
(Continued)

*Primary Examiner* — Brian T O Connor
(74) *Attorney, Agent, or Firm* — FIG. 1 Patents

(57) ABSTRACT

Embodiments of the present disclosure are directed to methods and apparatuses for PT-RS mapping. In an embodiment of the present disclosure, the method includes transmitting a first set of phase-tracking reference signals in a first plurality of subcarriers within a first resource block set associated with a first TCI state with a first frequency density; transmitting a second set of phase-tracking reference signals in a second plurality of subcarriers within a second resource block set associated with a second TCI state with a second frequency density, where the first resource block set and the second resource block set are frequency division multiplexed in a time interval and a third resource block set composed of the first resource block set and the second resource block set is scheduled by a DCI.

17 Claims, 10 Drawing Sheets

(58) Field of Classification Search
CPC ... H04L 5/0023; H04L 5/0044; H04L 5/0053; H04W 72/1273; H04B 7/0695; H04B 7/088

See application file for complete search history.

(56) References Cited

U.S. PATENT DOCUMENTS

| | | | | |
|---|---|---|---|---|
| 11,652,597 | B2* | 5/2023 | Frenne | H04W 72/23 370/329 |
| 11,916,830 | B2* | 2/2024 | Kim | H04L 5/0016 |
| 11,917,631 | B2* | 2/2024 | Lee | H04W 72/23 |
| 12,075,409 | B2* | 8/2024 | Lee | H04W 72/1273 |
| 12,160,381 | B2* | 12/2024 | Lee | H04L 5/0044 |
| 12,191,943 | B2* | 1/2025 | Park | H04B 7/0639 |
| 12,193,043 | B2* | 1/2025 | Kim | H04W 72/1263 |
| 2019/0296876 | A1 | 9/2019 | Zhang et al. | |

OTHER PUBLICATIONS

Huawei, et al., "Enhancements on Multi-TRP/panel transmission", 3GPP TSG RAN WG1 #97, R1-1906029, Reno, USA [retrieved Jun. 23, 2022]. Retrieved from the Internet <https://www.3gpp.org/ftp/tsg_ran/WG1_RL1/TSGR1_97/Docs>, May 2019, 17 pages.

LG Electronics, "Enhancements on multi-TRP/panel transmission", 3GPP TSG RAN WG1 Meeting #98bis, R1-1910582, Chongqing, China [retrieved Jul. 7, 2022]. Retrieved from the Internet <https://www.3gpp.org/ftp/tsg_ran/wg1_rL1/TSGR1_98b/Docs/>, Oct. 2019, 23 pages.

NEC, "Discussion on multi-TRP transmission", 3GPP TSG RAN WG1 #98bis, R1-1910573, Chongqing, China [retrieved Jun. 16, 2022]. Retrieved from the Internet <https://www.3gpp.org/ftp/tsg_ran/WG1_RL1/TSGR1_98b/Docs>, Oct. 2019, 3 pages.

Panasonic, "On multi-TRP enhancements for NR MIMO in Rel. 16", 3GPP TSG RAN WG1 #98bis, R1-1910523, Chongqing, China [retrieved Jun. 16, 2022]. Retrieved from the Internet <https://www.3gpp.org/ftp/tsg_ran/WG1_RL1/TSGR1_98b/Docs>, Oct. 2019, 11 pages.

PCT/CN2019/116690, "International Preliminary Report on Patentability", PCT Application No. PCT/CN2019/116690, May 19, 2022, 6 pages.

PCT/CN2019/116690, "International Search Report and Written Opinion", PCT Application No. PCT/CN2019/116690, Aug. 14, 2020, 8 pages.

ZTE, "Enhancements on Multi-TRP and Multi-panel Transmission", 3GPP TSG RAN WG1 #98bis, R1-1910284, Chongqing, China [retrieved Jul. 14, 2022]. Retrieved from the Internet <https://www.3gpp.org/ftp/tsg_ran/WG1_RL1/TSGR1_98b/Docs>, Oct. 2019, 20 pages.

* cited by examiner

METHOD AND APPARATUS FOR PT-RS MAPPING

TECHNICAL FIELD

Embodiments of the present disclosure generally relate to wireless communication technology, especially to a method and apparatus for Phase Tracking Reference Signal (PT-RS) mapping in Ultra-reliable and low-latency communications (URLLC).

BACKGROUND

URLLC is one of several different types of use cases supported by the 5G NR standard, as stipulated by 3GPP (3rd Generation Partnership Project) Release 15 (R15). URLLC will cater to multiple advanced services for latency0-sensitive connected devices, such as factory automation, autonomous driving, the industrial internet and smart grid or robotic surgeries.

Enhancements on MIMO (Multiple-Input Multiple-Output) for New Radio (NR) have been discussed in RP-181453. The work item aims to specify the enhancements identified for NR MIMO. One of the objectives is enhancements on multi-Transmit-Receive Point (TRP)/panel transmission including improved reliability and robustness with both ideal and non-ideal backhaul. Therefore, the diversity of multiple beams from multiple TRPs/panels should be utilized fully to meet the requirement of URLLC.

SUMMARY OF THE APPLICATION

An embodiment of the present disclosure provides a method. The method may include transmitting a first set of phase-tracking reference signals in a first plurality of subcarriers within a first resource block set associated with a first Transmission Configuration Indication (TCI) state with a first frequency density; transmitting a second set of phase-tracking reference signals in a second plurality of subcarriers within a second resource block set associated with a second TCI state with a second frequency density, wherein the first resource block set and the second resource block set are frequency division multiplexed in a time interval and a third resource block set composed of the first resource block set and the second resource block set is scheduled by a Downlink Control Information (DCI).

In an embodiment of the present disclosure, the first TCI state and the second TCI state are indicated by a TCI field in the DCI.

In another embodiment of the present disclosure, the first frequency density equals the second frequency density, and is determined by a total number of resource blocks in the third resource block set scheduled by the DCI, and wherein the total number of resource blocks scheduled by the DCI is the sum of a total number of resource blocks in the first resource block set and a total number of resource blocks in the second resource block set.

In another embodiment of the present disclosure, the first frequency density equals the second frequency density, and is determined by a minimal number of resource blocks between a total number of resource blocks in the first resource block set and a total number of resource blocks in the second resource block set.

In another embodiment of the present disclosure, the first frequency density equals the second frequency density, and is determined by a maximum number of resource blocks between a total number of resource blocks in the first resource block set and a total number of resource blocks in the second resource block set.

In another embodiment of the present disclosure, the first frequency density is determined by a total number of resource blocks in the first resource block set, and the second frequency density is determined by a total number of resource blocks in the second resource block set.

Another embodiment of the present disclosure provides a method. The method may include receiving a first set of phase-tracking reference signals in a first plurality of subcarriers within a first resource block set associated with a first TCI state with a first frequency density; receiving a second set of phase-tracking reference signals in a second plurality of subcarriers within a second resource block set associated with a second TCI state with a second frequency density, wherein the first resource block set and the second resource block set are frequency division multiplexed in a time interval and a third resource block set composed of the first resource block set and the second resource block set is scheduled by a DCI Another embodiment of the present disclosure provides a method. The method includes transmitting a first set of phase-tracking reference signals in a first plurality of symbols within a first symbol set associated with a first TCI state in a time density; transmitting a second set of phase-tracking reference signals in a second plurality of symbols within a second symbol set associated with a second TCI state in the time density, wherein the first symbol set and the second symbol set are time division multiplexed in a time interval and are scheduled by a DCI.

In an embodiment of the present disclosure, the first symbol set is determined by a time domain allocation indicator field in the DCI, the second symbols set is determined by the first symbol set and a symbol gap, and wherein the symbol gap is configured by a high layer. The first TCI state and the second TCI state are indicated by a TCI field in the DCI. The time density is determined by the modulation and code scheme value scheduled by the DCI.

Another embodiment of the present disclosure provides a method. The method includes receiving a first set of phase-tracking reference signals in a first plurality of symbols within a first symbol set associated with a first TCI state in a time density; receiving a second set of phase-tracking reference signals in a second plurality of symbols within a second symbol set associated with a second TCI state in the time density, wherein the first symbol set and the second symbol set are time division multiplexed in a time interval and are scheduled by a DCI.

Another embodiment of the present disclosure provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above methods with the at least one receiver, the at least one transmitter and the at least one processor.

The embodiments of the present disclosure can ensure that the resources allocated for each TRP can have the correct density of PT-RS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 1 is a schematic diagram illustrating an exemplary wireless communication system according to some embodiments of the present disclosure.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

A wireless communication system can have one TRP (or panel) or some TRPs (or panels). A TRP can act like a small base station. The TRPs can communicate with each other by backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, one single TRP can be used to serve one or more UEs under control of a base station. A base station can also have one or some TRPs. In different scenario, TRP may be called in different terms. In fact, in some scenarios, for example, in a scenario of CoMP (Coordinated Multi-Point), TRP can even be a base station. Persons skilled in the art should understand that as the 3GPP and the communication technology develop, the terminologies recited in the specification may change, which should not affect the scope of the present disclosure.

Figure 1:
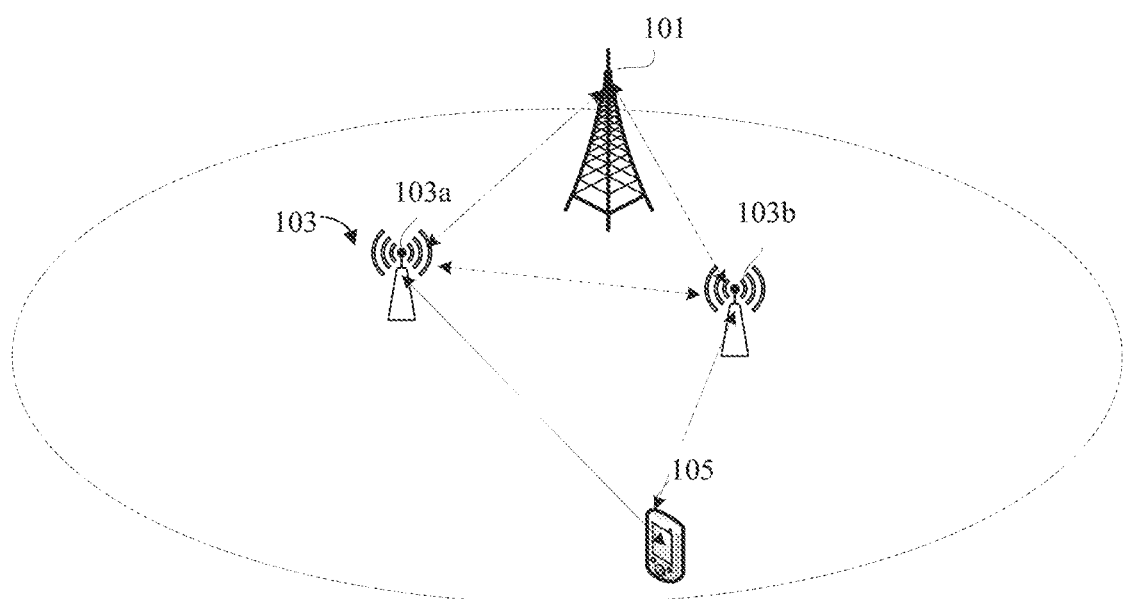

FIG. 1 is a schematic diagram illustrating an exemplary wireless communication system according to some embodiments of the present disclosure.

Referring to FIG. 1, a wireless communication system 100 can include a base station 101, TRPs 103 (e.g., TRP 103a and TRP 103b), and a UE 105. Although only one base station, two TRPs, and one UE are shown for simplicity, it should be noted that the wireless communication system 100 may further include more base stations, TRPs, and UEs.

The base station 101 may be a gNB in some scenarios (e.g. in 5G application scenario). The TRPs 103, for example, TRP 103a and TRP 103b may connect the base stations 101, via, for example, a backhaul link. Each of TRP 103 can serve the UE 105. As shown in FIG. 1, TRP 103a and TRP 103b can serve the UE 105 within a serving area or region (e.g., a cell or a cell sector). The TRP 103a and TRP 103b can communicate to each other via, for example, a backhaul link.

In some embodiments of the present disclosure, the base station 101 may also be referred to as an access point, an access terminal, a base, a macro cell, a Node-B, an evolved Node B (eNB), a gNB, or described using other terminology used in the art. The UE 105 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 105 can be a computing device, a wearable device, or a mobile device, etc.

In accordance with NR R15, a base station may transmit data for a UE having relatively great tolerance of transmission delay or latency, for example an enhanced mobile broadband (eMBB) UE. The base station may also need to transmit data to another UE which may have relatively less tolerance of transmission delay or latency (e.g. an URLLC UE).

In the present application, it is assumed that the communication between two TRPs is via an ideal backhaul link. Therefore, the latency of the ideal backhaul link between TRP 103a and TRP 103b may be deemed as zero. The two TRPs can share information between them, for example, Downlink Control Information (DCI) for Physical Downlink Shared Channel (PDSCH), with zero latency.

For multi-TRP transmission, the same transport block (TB) can be transmitted from two different TRPs (for example, TRP 103a and TRP 103b as shown in FIG. 1), to the same UE (for example, the UE 105). In order to support soft combining at the UE end, different redundancy versions (RVs) can be used for these repeated TBs. In addition, in order to further enhance the reliability of transmission, these repeated TBs can be scheduled by repeated Physical Downlink Control Channel (PDCCH).

For the transmission mode of the repeated TBs, spatial division multiplexing (SDM) (also called scheme 1), frequency division multiplexing (FDM) (also called scheme 2), time division multiplexing (TDM) within a time slot (also called scheme 3), and time division multiplexing (TDM) between time slots (also called scheme 4) are determined as candidate technology for multi-TRP based URLLC transmission scheme at the RAN 1 #96 meeting of 3GPP.

For scheme 2 (also called single-DCI based MULTI-TRP URLLC scheme 2), there is a plurality of Transmission Configuration Indication (TCI) states within a single slot, and non-overlapped frequency resource is allocated to the TBs. In some embodiments, a beam indication can be based on the TCI states. Each non-overlapped frequency resource allocation is associated with one TCI state. Same single/multiple Demodulation Reference Signal (DMRS) port(s) are associated with all non-overlapped frequency resource allocations. For one of scheme 2, scheme 2a, single codeword with one RV is used across full resource allocation. From UE perspective, the common Resource Block (RB) mapping (codeword to layer mapping) is applied across full resource allocation. For another scheme 2, scheme 2b, there are two different codewords, and single codeword with one RV is used for each non-overlapped frequency resource allocation. The RVs corresponding to each non-overlapped frequency resource allocation can be the same or different.

For scheme 3 (also called single-DCI based MULTI-TRP URLLC scheme 3), there is a plurality of TCI states within a single slot, and non-overlapped frequency resource is allocated to the TBs. Each transmission occasion of the TB has one TCI and one RV with the time granularity of mini-slot. All transmission occasion (s) within the slot use a common MCS with same single or multiple DMRS port(s). RV/TCI state can be same or different among transmission occasions.

There are some agreements related to the resource allocation of scheme 2 and scheme 3.

For the single-DCI based MULTI-TRP URLLC scheme 2 (including schemes 2a and 2b), comb-like frequency resource allocation between/among TRPs is supported. Precoding resource block group (PRG) can be configured or indicated as 'wideband', that is, PRG size=2 or 4, which means one PRG includes 2 RBs or 4 RBs. For wideband PRG, a half number of RBs are assigned to TCI state 1 and the remaining RBs are assigned to TCI state 2. For PRG size=2 or 4, even PRGs within the allocated frequency domain resource assignment (FDRA) are assigned to TCI state 1 and odd PRGs within the allocated FDRA are assigned to TCI state 2.

For the single-DCI based MULTI-TRP URLLC scheme 3, the number of transmission occasions within a single slot is implicitly determined by the number of TCI states indicated by a code point, where one TCI state means one transmission occasion and two states means two transmission occasions.

Moreover, for the single-DCI based MULTI-TRP URLLC scheme 3, a starting symbol and length of the first transmission occasion is indicated by a start and length indicator (SLIV) in DCI. A starting symbol of the second transmission occasion has K symbol offset relative to the last symbol of the first transmission occasion, where the value of K can be optionally configured by Radio Resource Control (RRC). If not configured, K=0. The length of the second transmission occasion is the same with the first transmission occasion.

The main function of a PT-RS is to track phase of the local oscillator at transmitter and receiver. PT-RS enables suppression of phase noise and common phase error especially at higher mmWave frequencies. PT-RS has introduced into 5G NR, and is present both in uplink (in Physical Uplink Shared Channel (PUSCH)) and downlink (in PDSCH) channels.

In NR R15, PT-RS mapping to physical resources (which also be called NR R15 PT-RS mapping scheme) in time domain and frequency domain is drafted. For the PT-RS mapping in time domain, the PT-RS is mapped to OFDM symbols of the scheduled PDSCH according to the following formula (1), starting from the first symbol of the scheduled PDSCH and avoiding the location of the DMRS symbol with a time density $L_{PT-RS}$, until the end of the PDSCH. For the PT-RS mapping in frequency domain, the PT-RS is mapped to subcarriers according to the following formula (2).

In particular, PT-RS mapping to physical resources is drafted in TS 38.211 7.4.1.2.2, and is described as follows:

The UE shall assume PT-RSs being present only in the RBs used for the PDSCH, and only if the procedure in [6, TS 38.214] indicates phase-tracking reference signals being used. If present, the UE shall assume the PDSCH PT-RS is scaled by a factor $\beta_{PT-RS,i}$ to conform to the transmission power specified in clause 4.1 of [6, TS 38.214] and mapped to resource elements $(k, l)_{p,\mu}$ according to $$a_{k,l}^{(p,\mu)} = \beta_{PT-RS,i} r_k \qquad (1)$$

when all the following conditions are fulfilled
1 is within the OFDM symbols allocated for the PDSCH transmission
resource element $(k, l)_{p,\mu}$ is not used for DM-RS, non-zero-power CSI-RS not configured for mobility measurements, zero-power CSI-RS, SS/PBCH block, a detected PDCCH, or is declared as 'not available' by clause 5.1.4.1 of [6, TS 38.214]

The set of time indices l defined relative to the start of the PDSCH allocation is defined by
1. set i=0 and $l_{ref}=0$
2. if any symbol in the interval max($l_{ref}+(i-1)L_{PT-RS}+1$, $l_{ref}$), ..., $l_{ref}+iL_{PT-RS}$ overlaps with a symbol used for DM-RS according to clause 7.4.1.1.2
   set i=1
   set $l_{ref}$ to the symbol index of the DM-RS symbol in case of a single-symbol DM-RS and to the symbol index of the second DM-RS symbol in case of a double-symbol DM-RS
   repeat from step 2 as long as $l_{ref}+iL_{PT-RS}$ is inside the PDSCH allocation
3. add $l_{ref}+iL_{PT-RS}$ to the set of time indices for PT-RS
4. increment i by one
5. repeat from step 2 above as long as $l_{ref}+iL_{PT-RS}$ is inside the PDSCH allocation where $L_{PT-RS} \in \{1, 2, 4\}$.

For the purpose of PT-RS mapping, the RBs allocated for PDSCH transmission are numbered from 0 to $N_{RB}-1$ from the lowest scheduled resource block to the highest. The corresponding subcarriers in this set of RBs are numbered in increasing order starting from the lowest frequency from 0 to $N_{sc}^{RB}N_{RB}-1$ where $N_{sc}^{RB}$ is the number of subcarriers in a RB. The subcarriers to which the UE shall assume the PT-RS is mapped are given by $$k = k_{ref}^{RE} + (iK_{PT-RS} + k_{ref}^{RB})N_{sc}^{RB} \qquad (2)$$

$$k_{ref}^{RB} = \begin{cases} n_{RNTI} \bmod K_{PT-RS} & \text{if } N_{RB} \bmod K_{PT-RS} = 0 \\ n_{RNTI} \bmod (N_{RB} \bmod K_{PT-RS}) & \text{otherwise} \end{cases}$$

where
i=0, 1, 2, . . . .
$k_{ref}^{RE}$ is given by Table 7.4.1.2.2-1 for the DM-RS port associated with the PT-RS port according to clause 5.1.6.2 in [6, TS 38.214]. If the higher-layer parameter resourceElementOffset in the PT-RS-DownlinkConfig IE is not configured, the column corresponding to '00' shall be used.

$n_{RNTI}$ is the RNTI associated with the DCI scheduling the transmission $N_{RB}$ is the number of RBs scheduled $K_{PT-RS} \in \{2,4\}$ is given by [6, TS 38.214].

Table 1 illustrates the value of the parameter $k_{ref}^{RE}$, which is the same as the Table 7.4.1.2.2-1 in TS 38.214.

TABLE 1

| DM-RS antenna | DM-RS Configuration type 1 resourceElementOffset | | | | DM-RS Configuration type 2 resourceElementOffset | | | |
|---|---|---|---|---|---|---|---|---|
| port p | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

Figure 2:
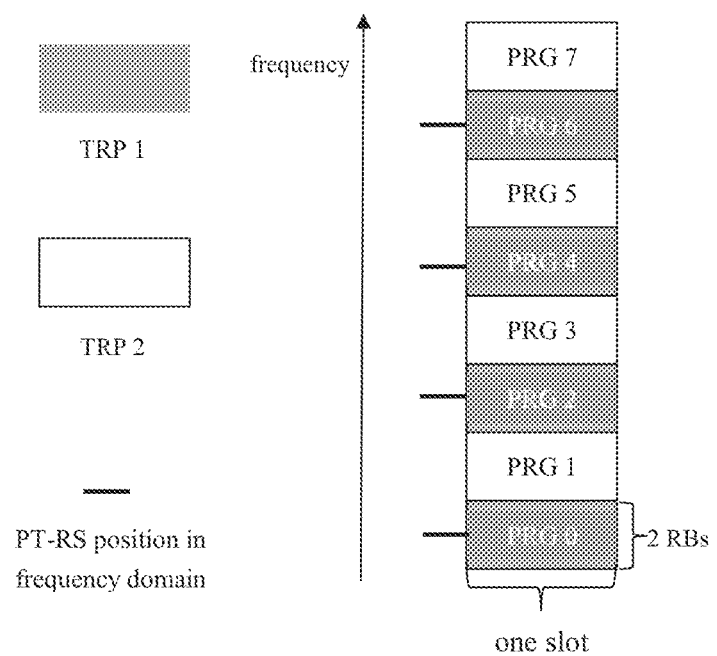
FIG. 2 illustrates an exemplary scenario of PT-RS mapping in single-DCI based URLLC scheme 2 by using NR R15 mapping scheme according to an embodiment of the present disclosure.

FIG. 2 illustrates an exemplary scenario of PT-RS mapping in single-DCI based URLLC scheme 2 by using the NR R15 PT-RS mapping scheme according to an embodiment of the present disclosure.

As discussed above, there is an agreement for the single-DCI based multi-TRP URLLC scheme 2. According to the agreement, as shown in FIG. 2, comb-like frequency resource allocation between TRPs, TRP 1 and TRP 2 (which correspond to TRP 103a and TRP 103b in FIG. 1) is supported. It is assumed that PRG size=2, thus according to the agreement, for PRG size=2, all the RBs in the even PRG indexes (that is, PRG 0, PRG 2, PRG 4, and PRG 6) are assigned to TRP 1 which is associated with TCI state 1 while all the RBs in the odd PRG indexes (that is, PRG 1, PRG 3, PRG 5, and PRG 7) are assigned to TRP 2 which is associated with TCI state 2.

It is also assumed that $K_{PT-RS}=4$, thus according to the above formula (2) in the NR R15 PT-RS mapping scheme, all the PT-RSs are mapped to the RBs allocated to the same TRP (TRP 1) and there is no PT-RS in all the RBs allocated to the other TRP (TRP 2), as shown in FIG. 2. Considering that the radio frequency (RF) chains of different TRPs are different, RBs allocated to each TRP should have PT-RS to estimate and compensate the phase noise. Therefore, the NR R15 PT-RS mapping scheme should be enhanced in single-DCI based URLLC since the scheme cannot be reused straightforward. In other words, the NR R15 PT-RS mapping scheme should be reconsidered to ensure that the resources allocated for each TRP can have the correct density of PT-RS.

The present disclosure propose a method of PT-RS mapping based on single-DCI based URLLC scheme 2 to ensure that the resources allocated for each TRP can have the correct density of PT-RS.

As discussed above, there is an agreement for single-DCI based multi-TRP URLLC scheme 2. According to the agreement, the frequency resource allocation between two TRPs in single-DCI based URLLC scheme 2 is comb-like. PRG can be configured or indicated as 'wideband', '2' or '4' in R15. For wideband PRG, first half number of RBs are assigned to TCI state 1 and the remaining RBs are assigned to TCI state 2. For PRG size=2 or 4, even PRGs within the allocated FDRA are assigned to TCI state 1 and odd PRGs within the allocated FDRA are assigned to TCI state 2.

The two TRPs may be TRP 1 (which corresponding to TRP 103a in FIG. 1) and TRP 2 (which corresponding to TRP 103b in FIG. 1). Before performing the PT-RS mapping, the base station side apparatus (for example, TRP 1 or TRP 2) may transmit PDCCH which carrying DCI which includes resource allocation information and other control information to the UE (for example UE 105 in FIG. 1). A code point of a TCI field in the DCI is corresponding to two TCI states, that is, TCI state 1 and TCI state 2, where TCI state 1 corresponds to TRP 1, and TCI state 2 corresponds to TRP 2. Thus which TRP each Physical resource block (PRB) indicated in the DCI corresponds to can be known according to the TCI states indicated by a TCI field in the DCI. In the present application, PRB may also be called RB.

The resource allocation information (for example, indicated by a frequency domain allocation indicator field) in the DCI indicates the frequency resource allocation of the RBs allocated to TRPs, which is drafted in TS 38.214 5.1.2.2. Then the total number of PRBs allocated for TRP 1' transmission can be named as $N_{RB}^1$, and the total number of PRBs allocated for TRP 2's transmission can be named as $N_{RB}^2$. Apparently, the total PRBs $N_{RB}$ indicated in the DCI equals $N_{RB}^1 + N_{RB}^2$.

Since all the RBs scheduled for a single-DCI based URLLC scheme 2 share a same time domain allocation in a slot, the time domain position of PT-RS is the same as that in R15, so only the frequency domain mapping of PT-RS is discussed in detail here.

For the purpose of PT-RS mapping, the RBs allocated for TRP 1's transmission are numbered from 0 to $N_{RB}^1-1$ from the lowest index to the highest index of RBs which are scheduled (or allocated) for TRP 1's transmission. Similarly, the RBs allocated for TRP 2's transmission are numbered from 0 to $N_{RB}^2-1$ from the lowest index to the highest index of RBs which are scheduled (or allocated) for TRP 2's transmission.

The corresponding subcarriers in the RBs allocated for TRP 1's transmission are numbered in increasing order starting from the lowest frequency from 0 to $N_{sc}^{RB} N_{RB}^1 - 1$ where $N_{sc}^{RB}$ is the number of subcarriers in a RB, and the corresponding subcarriers in the RBs allocated for TRP 2's transmission are numbered in increasing order starting from the lowest frequency from 0 to $N_{sc}^{RB} N_{RB}^2 - 1$.

The subcarriers to which the UE shall assume the PT-RS is mapped in the RBs scheduled (or allocated) for TRP 1's transmission $k_1$ are given by the following formula (3), and the subcarriers to which the UE shall assume the PT-RS is mapped in the RBs scheduled (or allocated) for TRP 2's transmission $k_2$ are given by the following formula (4):

$$k_1 = k_{ref}^{RE} + (iK_{PT-RS}^1 + k_{ref,1}^{RB})N_{sc}^{RB} \qquad (3)$$

$$k_{ref,1}^{RB} = \begin{cases} n_{RNTI} \bmod K_{PT-RS}^1 & \text{if } N_{RB}^1 \bmod K_{PT-RS}^1 = 0 \\ n_{RNTI} \bmod (N_{RB}^1 \bmod K_{PT-RS}^1) & \text{otherwise} \end{cases}$$

$$k_2 = k_{ref}^{RE} + (iK_{PT-RS}^2 + k_{ref,2}^{RB})N_{sc}^{RB} \qquad (4)$$

$$k_{ref,2}^{RB} = \begin{cases} n_{RNTI} \bmod K_{PT-RS}^2 & \text{if } N_{RB}^2 \bmod K_{PT-RS}^2 = 0 \\ n_{RNTI} \bmod (N_{RB}^2 \bmod K_{PT-RS}^2) & \text{otherwise} \end{cases}$$

where
- i=0, 1, 2, . . . .
- $k_{ref}^{RE}$ is given by the above Table 1 for the DM-RS port associated with the PT-RS port according to clause 5.1.6.2 in TS 38.214. If the higher-layer parameter resourceElementOffset in the PT-RS-DownlinkConfig IE is not configured, the column corresponding to '00' shall be used.

$n_{RNTI}$ is the RNTI associated with the DCI scheduling the transmission $N_{RB}^1$ and $N_{RB}^2$ are the number of RBs scheduled for TRP 1's transmission and the number of RBs scheduled for TRP 2's transmission respectively.

$K_{PT-RS}^1, K_{PT-RS}^2 \in \{2,4\}$ are the frequency density of PT-RS in the resources scheduled for TPR 1's transmission and TRP 2's transmission respectively, and they are determined by $N_{RB}^1$ and $N_{RB}^2$.

Table 2 illustrates the value of the frequency density $K_{PT-RS}$, which is already drafted in TS 38.214 5.1.6.3.

TABLE 2

| Scheduled bandwidth | Frequency density ($K_{PT-RS}$) |
|---|---|
| $N_{RB} < N_{RB0}$ | PT-RS is not present |
| $N_{RB0} \le N_{RB} < N_{RB1}$ | 2 |
| $N_{RB1} \le N_{RB}$ | 4 |

According to some embodiments of the present disclosure, there are several options can be selected to determine the value of the frequency density $K_{PT-RS}$ of PT-RS for each TRP. From Table 2, the value of $K_{PT-RS}$ (which also represents the value of $K_{PT-RS}^1$ or $K_{PT-RS}^2$) is determined by the scheduled bandwidth. In Table 2, $N_{RB0}$ and $N_{RB1}$ are pre-configured.

Option 1, $K_{PT-RS}^1$ equals $K_{PT-RS}^2$, and it is determined by $N_{RB} = N_{RB}^1 + N_{RB}^2$ according to Table 2, where $N_{RB}$ in Table 2 equals $N_{RB} = N_{RB}^1 + N_{RB}^2$.

Option 2: $K_{PT-RS}^1$ equals $K_{PT-RS}^2$, and it is determined by min ($N_{RB}^1$, $N_{RB}^2$) according to Table 2, where $N_{RB}$ in Table 2 equals min ($N_{RB}^1$, $N_{RB}^2$).

Option 3: $K_{PT-RS}^1$ equals $K_{PT-RS}^2$, and it is determined by max ($N_{RB}^1$, $N_{RB}^2$) according to Table 2, where $N_{RB}$ in Table 2 equals max ($N_{RB}^1$, $N_{RB}^2$).

Option 4: $K_{PT-RS}^1$ is determined by $N_{RB}^1$ according to Table 2 where $N_{RB}$ in Table 2 equals $N_{RB}^1$; while $K_{PT-RS}^2$ is determined by $N_{RB}^2$ according to Table 2 where $N_{RB}$ in Table 2 equals $N_{RB}^2$.

Figure 3:
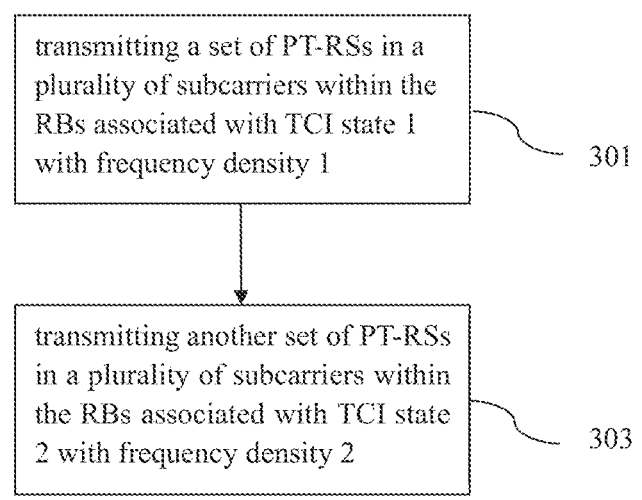
FIG. 3 is a flow diagram illustrating of a method for PT-RS mapping in URLLC based on single-DCI based URLLC scheme 2 in accordance with some embodiments of the present disclosure.

FIG. 3 illustrates a flow chart of a method for PT-RS mapping in URLLC according to some embodiments of the present disclosure. The method may be performed by base station side apparatus. The base station side apparatus may indicate the base station 101, TRP 103a, TRP 103b as shown in FIG. 1 or any combination of them. That is, from UE perspective, the based station 101, TRP 103a, TRP 103b can be deemed as one apparatus, although they are distinguished here for the convenience of description.

Before performing the PT-RS mapping, the base station side apparatus (for example, one TRP of TRP 1 and TRP 2) may transmit a PDCCH which carrying DCI which includes resource allocation information (for example, indicated by a frequency domain allocation indicator field) and other control information to the UE. TRP 1 and TRP 2 communicate with each other via an ideal backhaul link. Other control information may include a TCI field.

For the PT-RS mapping, as shown in FIG. 3, in step 301, TRP 1 (which corresponds to TRP 103a in FIG. 1) transmits a set of PT-RSs in a plurality of subcarriers within the RBs associated with TCI state 1 with frequency density 1. TCI state 1 corresponds to TRP 1.

In step 302, TRP 2 (which corresponds to TRP 103b in FIG. 1) transmits another set of PT-RSs in a plurality of subcarriers within the RBs associated with TCI state 2 with frequency density 2. TCI state 2 corresponds to TRP 2. The frequency density 1 and the frequency density 2 can be determined according to one of the options as discussed above.

Although step 301 is described before step 302, it does not mean step 301 is performed before step 302. The RBs associated with TCI state 1 and the RBs associated with TCI state 2 are frequency division multiplexed in a slot.

Figure 4:
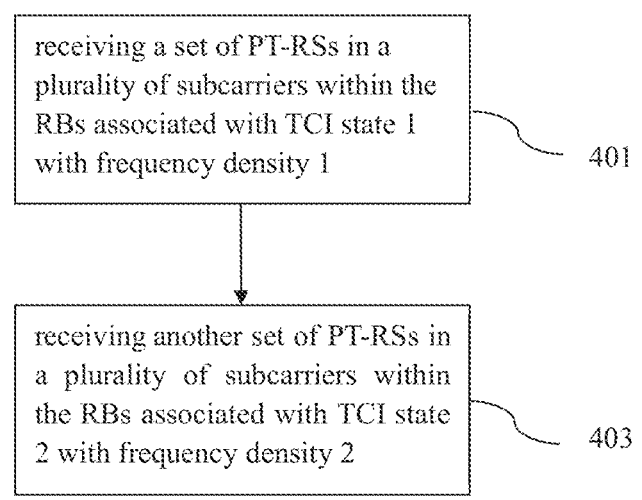
FIG. 4 is a flow diagram illustrating of another method for PT-RS mapping in URLLC based on single-DCI based URLLC scheme 2 in accordance with some embodiments of the present disclosure.

FIG. 4 illustrates a flow chart of a method for PT-RS mapping in URLLC according to some embodiments of the present disclosure. The method may be performed by the UE, for example UE 105 in FIG. 1.

As described above, before performing the PT-RS mapping by the base station side apparatus (for example, TRP 1 or TRP 2), the base station side apparatus may transmit a PDCCH which carrying DCI which includes resource allocation information and other control information to the UE.

As shown in FIG. 4, in step 401, the UE receives a set of PT-RSs in a plurality of subcarriers within the RBs associated with TCI state 1 with frequency density 1 from the base station side apparatus.

In step 402, the UE receives another set of PT-RSs in a plurality of subcarriers within the RBs associated with TCI state 2 with frequency density 2 from the base station side apparatus. And the frequency density 1 and the frequency density 2 can be determined according to one of the options as discussed above.

Although step 401 is described before step 402, it does not mean step 401 is performed before step 402. Actually, the RBs associated with TCI state 1 and the RBs associated with TCI state 2 are frequency division multiplexed in a slot.

In particular, the RBs composed of the RBs associated with TCI state 1 and the RBs associated with TCI state 2 can be indicated by the DCI, for example a frequency domain allocation indicator field in the DCI. The UE may determine which TRP each RB in the scheduled RBs associated with TCI state 1 and the scheduled RBs associated with TCI state 2 corresponds to, according to the TCI field in the DCI which indicates the TCI state 1 and the TCI state 2 according to the agreement that the frequency resource allocation between two TRPs in single-DCI based URLLC scheme 2 is comb-like. Moreover, the UE may obtain the PT-RSs from the base station side apparatus (actually from the TRP 1 and TRP 2) according to the frequency density 1 and the frequency density 2.

Figure 5:
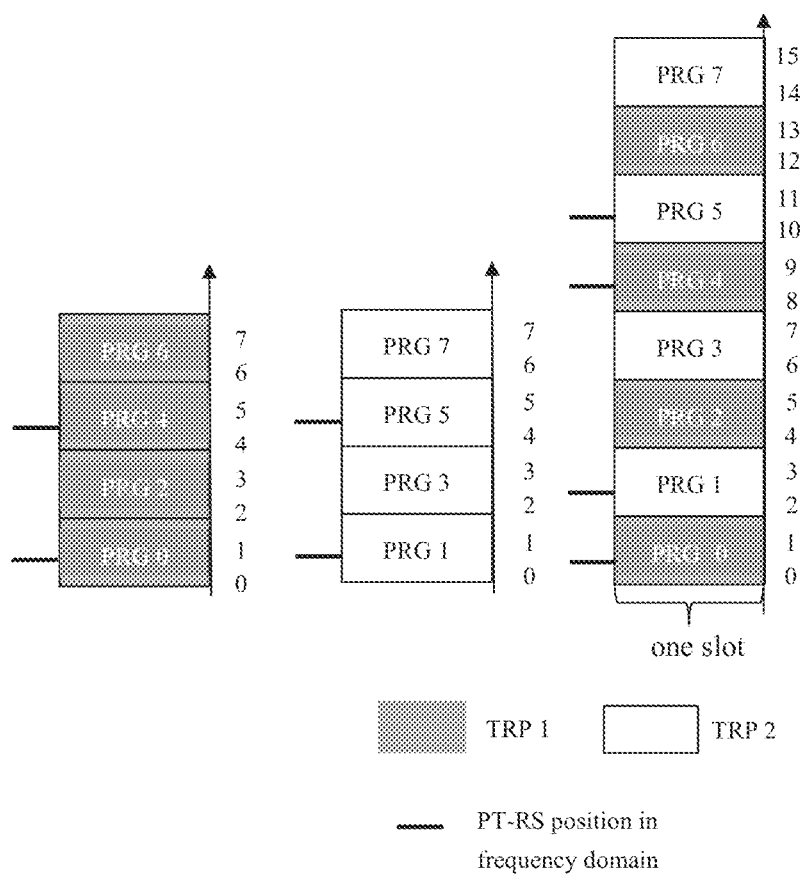
FIG. 5 illustrates an exemplary scenario of implementing the method of PT-RS mapping based on single-DCI based URLLC scheme 2 according to an embodiment of the present disclosure.

FIG. 5 illustrates an exemplary scenario of implementing the method of PT-RS mapping in URLLC according to an embodiment of the present disclosure.

In FIG. 5, it is assumed that there are $N_{RB}=16$ RBs scheduled for a URLLC scheme 2 transmission, the number of RBs scheduled for TRP 1's transmission and TRP 2's transmission is same which is 8 ($N_{RB}^1=8$, $N_{RB}^2=8$).

In addition, it is also assumed that the PRG size is configured as 2. From FIG. 5, according to the agreement, comb-like frequency resource allocation is between TRP 1 and TRP 2; and for PRG size=2, it can be seen that all the RBs in the PRGs with even indexes are the RBs allocated for TRP 1, which are PRG 0, PRG 2, PRG 4, and PRG 6, and all the RBs in the PRGs with odd indexes are the RBs allocated for TRP 2, which are PRG 1, PRG 3, PRG 5, and PRG 7.

In addition, in the example of FIG. 5, the option 4 is adopted to determine frequency density of PT-RS in each TRP's scheduled RBs, that is, it can be determined that $K_{PT-RS}^1 = K_{PT-RS}^2 = 4$ by $N_{RB}^1$ and $N_{RB}^2$ (Option 4 is: $K_{PT-RS}^1$ is determined by $N_{RB}^1$ according to Table 2 where $N_{RB}$ in Table 2 equals $N_{RB}^1$; while $K_{PT-RS}^2$ is determined by $N_{RB}^2$ according to Table 2 where $N_{RB}$ in Table 2 equals $N_{RB}^2$ and $N_{RB1} \leq N_{RB}^1 = N_{RB}^2$).

For determining the PT-RS position in frequency domain, the RBs scheduled for each TRP can be separated and then the PT-RS position in frequency domain for RBs scheduled for each TRP's transmission is calculated according the above formula (3) and (4). In the example of FIG. 5, it is also assumed that $k_{ref}^{RE}=10$, and $k_{ref,1}^{RB}=k_{ref,2}^{RB}=0$. Then the PT-RS position in frequency domain for RBs scheduled for each TRP's transmission is shown in FIG. 5. And then TRP 1 and TRP 2 can transmit the PT-RSs respectively in frequency division multiplexing according to the combined all the RBs allocated for the whole URLLC scheme 2 transmission according to the RB indexes for the lowest to the highest with the calculated PT-RS frequency domain position as shown in the rightmost figure in FIG. 5.

From FIG. 5, the PT-RSs are mapped to both the RBs allocated to TRP 1 and the RBs allocated to TRP 2, thus the UE which receives the PT-RSs can estimate and compensate the phase noise with respect to TRP 1 and TRP 2.

The present disclosure also proposes another method of PT-RS mapping based on single-DCI based URLLC scheme 3 to ensure that the resources allocated for each TRP can have the correct density of PT-RS.

Since the frequency resource allocation of each transmission occasion in single-DCI based URLLC scheme 3 is same, the present embodiment of the present disclosure only focuses to PT-RS time domain allocation for two TRPs.

The two TRPs may be TRP 1 (which corresponding to TRP 103a in FIG. 1) and TRP 2 (which corresponding to TRP 103b in FIG. 1). Before performing the PT-RS mapping, the base station side apparatus (for example, one TRP of TRP 1 and TRP 2) may transmit a PDCCH which carrying DCI which includes resource allocation information and other control information to the UE (for example UE 105 in FIG. 1).

As discussed above, there are agreements for single-DCI based multi-TRP URLLC scheme 3. The agreements describe that: the number of transmission occasions within a single slot is implicitly determined by the number of TCI states indicated by a code point of a TCI field in the DCI; and a starting symbol and length of the first transmission occasion is indicated by a start and length indicator (SLIV) (or may also be called a time domain allocation indicator field) in DCI. A starting symbol of the second transmission occasion has K symbol offset (or may also be called a symbol gap) relative to the last symbol of the first transmission occasion, where the value of K can be optionally configured by a higher layer, for example, RRC layer. If not configured, K=0. The length of the second transmission occasion is the same with the first transmission occasion.

In the present application, the maximum transmission occasion number is 2, and the code point of a TCI field in the DCI is corresponding to two TCI states, that is, TCI state 1 and TCI state 2, where TCI state 1 corresponds to TRP 1 and TCI state 2 corresponds to TRP 2, and each transmission occasion is transmitted by only one TRP, TRP 1 or TRP 2.

For the purpose of PT-RS mapping, the OFDM symbols allocated to the first transmission occasion which is transmitted from TRP 1 are numbered from 0 to L−1 from the lowest index to the highest index of OFDM symbol which are scheduled for TRP 1's transmission. Similarly, the OFDM symbols allocated to the second transmission occasion which is transmitted from TRP 2 are also numbered from 0 to L−1 from the lowest index to the highest index of OFDM symbol since the two transmission occasions have the same symbol length.

In some embodiments of the present disclosure, the PT-RS time domain allocation for each transmission occasion can be gotten according to the above formula (1), that is, by reusing the mapping scheme in R15 which is drafted in TS 38.211 7.4.1.2.2.

In order to determine the PT-RS time domain allocation for each transmission occasion by reusing the mapping scheme in R15, the time density $L_{PT-RS}$ of PT-RS needs be determined. In some embodiments of the present disclosure, the modulation and code schemes (MCS) of the two transmission occasions are the same and the time density of PT-RS is determined by MCS in R15 drafted in TS 38.214 5.1.6.3 which is shown in Table 3, and the time density of PT-RS in two transmission occasion is the same.

Table 3 illustrates the value of the time density $L_{PT-RS}$ of PT-RS.

TABLE 3

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In Table 3, ptrs-MCS1, ptrs-MCS2, ptrs-MCS3, and ptrs-MCS4 are pre-configured.

Figure 6:
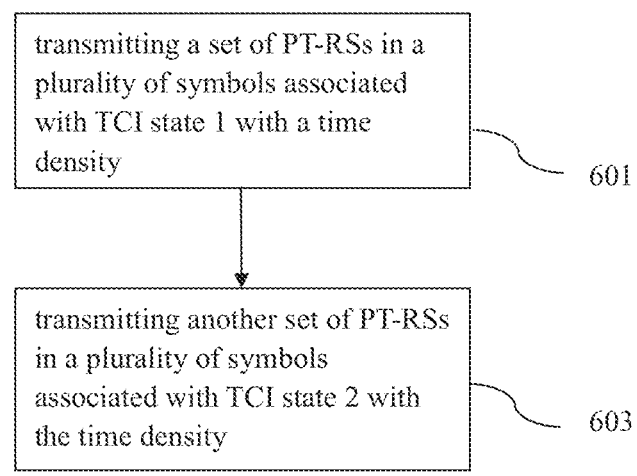
FIG. 6 illustrates a flow chart of another method for PT-RS mapping in URLLC based on single-DCI based URLLC scheme 3 according to some embodiments of the present disclosure.

FIG. 6 illustrates a flow chart of another method for PT-RS mapping in URLLC according to some embodiments of the present disclosure. The method may be performed by base station side apparatus. The base station side apparatus may indicate the base station 101, TRP 103a, TRP 103b as shown in FIG. 1 or any combination of them. That is, from UE perspective, the based station 101, TRP 103a, TRP 103b can be deemed as one apparatus, although they are distinguished here for the convenience of description.

Before performing the PT-RS mapping, the base station side apparatus (for example, one TRP of TRP 1 and TRP 2) may transmit a PDCCH which carrying DCI which includes resource allocation information (for example, a time domain allocation indicator field) and other control information to the UE. TRP 1 and TRP 2 communicate with each other via an ideal backhaul link. Other control information may include TCI field, and MCS field.

For the PT-RS mapping, as shown in FIG. 6, in step 601, TRP 1 (which corresponds to TRP 103a in FIG. 1) transmits a set of PT-RSs in a plurality of OFDM symbols associated with TCI state 1 with a time density. TCI state 1 corresponds to TRP 1.

In step 602, TRP 2 (which corresponds to TRP 103b in FIG. 1) transmits another set of PT-RSs in a plurality of OFDM symbols associated with TCI state 2 with the time density. TCI state 2 corresponds to TRP 2.

Although step 601 is described before step 602, it does not mean step 601 is performed before step 602. The OFDM symbols associated with TCI state 1 and the OFDM symbols associated with TCI state 2 are time division multiplexed in a slot.

Figure 7:
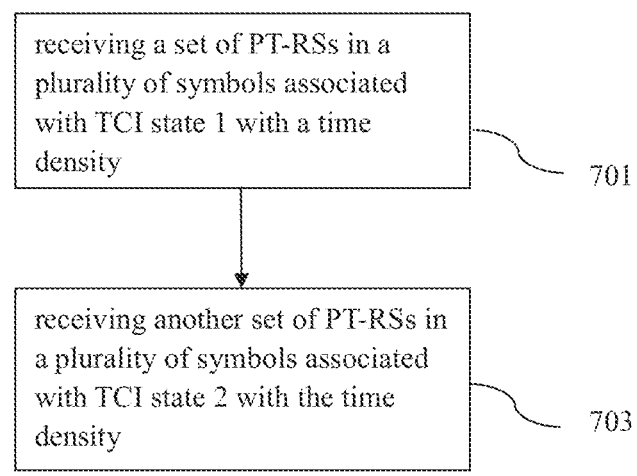
FIG. 7 illustrates a flow chart of another method for PT-RS mapping in URLLC based on single-DCI based URLLC scheme 3 according to some embodiments of the present disclosure.

FIG. 7 illustrates a flow chart of another method for PT-RS mapping in URLLC according to some embodiments of the present disclosure. The method may be performed by the UE, for example UE 105 in FIG. 1.

As described above, before performing the PT-RS mapping by the base station side apparatus (for example, one TRP of TRP 1 and TRP 2), the base station side apparatus may transmit a PDCCH which carrying DCI which includes resource allocation information (for example, a time domain allocation indicator field) and other control information to the UE. Other control information may include TCI field, and MCS field.

As shown in FIG. 7, in step 701, the UE receives a set of PT-RSs in a plurality of OFDM symbols associated with TCI state 1 with a time density from the base station side apparatus.

In step 702, the UE receives another set of PT-RSs in a plurality of OFDM symbols associated with TCI state 2 with the time density from the base station side apparatus.

Although step 701 is described before step 702, it does not mean step 701 is performed before step 702. Actually, the OFDM symbols associated with TCI state 1 and the OFDM symbols associated with TCI state 2 are time division multiplexed in a slot.

Figure 8:
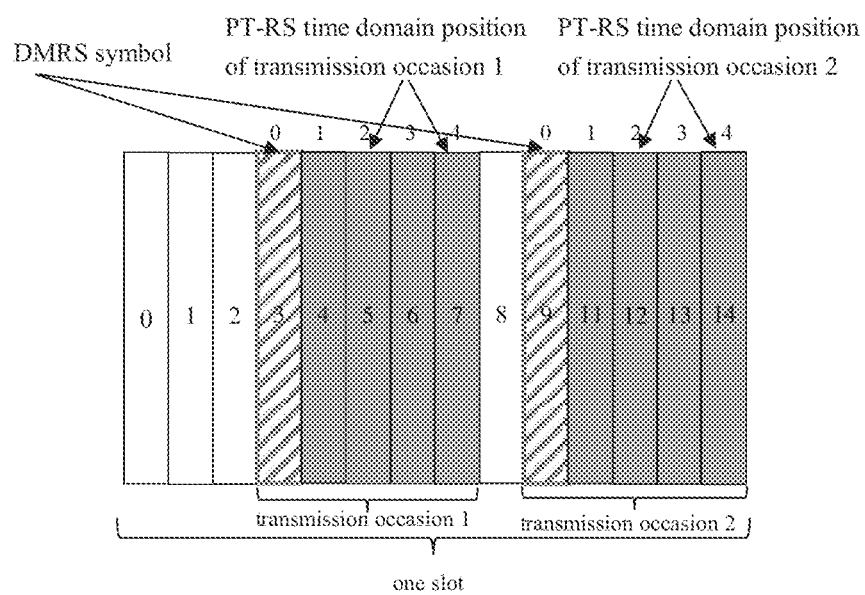
FIG. 8 illustrates an exemplary scenario of implementing the method of PT-RS mapping based on single-DCI based URLLC scheme 3 according to an embodiment of the present disclosure.

FIG. 8 illustrates an exemplary scenario of implementing the method of PT-RS mapping based on single-DCI based URLLC scheme 3 according to an embodiment of the present disclosure.

In FIG. 8, it is assumed that each transmission occasion has L=5 OFDM symbols which includes 1 front-loaded DMRS symbol. Besides, it is also assumed that the start symbol of the first transmission occasion is symbol 3 and there is 1 OFDM symbol gap between the two transmission occasions.

As shown in FIG. 8, the OFDM symbols in the first transmission occasion are scheduled for TRP 1's transmission, and the OFDM symbols in second transmission occasion are scheduled for TRP 2's transmission.

For PT-RS mapping in time domain, the OFDM symbols scheduled for each transmission occasion are numbered from 0 to L−1 (4) from the lowest index to the highest index of the scheduled OFDM symbols. It is assumed that the time density of PT-RS ($L_{PT-RS}$) is 2, then the PT-RS is mapped in the third symbol and fifth symbol scheduled for each transmission occasion according to the above mapping scheme in R15. As shown in FIG. 8, the PT-RSs are mapped in symbol #5 and symbol #7 (in the first transmission occasion) and in symbol #12 and symbol #14 (in the second transmission occasion) in the slot.

Figure 9:
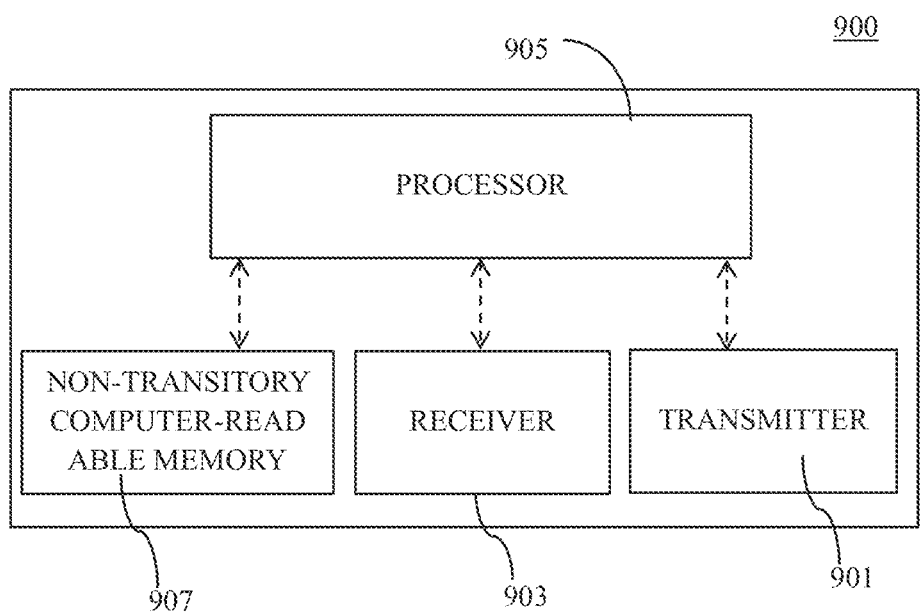
FIG. 9 is a schematic block diagram illustrating an exemplary apparatus according to an embodiment of the present disclosure.

FIG. 9 is a schematic block diagram illustrating an exemplary apparatus 900 according to an embodiment of the present disclosure. In some embodiments of the present disclosure, the apparatus 900 may be the base station side apparatus as above discussed. The apparatus 900 may perform the method as shown in FIG. 3 and FIG. 6.

Referring to FIG. 9, the apparatus 900 may include at least one transmitter 901. In an embodiment of the present disclosure, the at least one transmitter 901 may transmit a set of PT-RSs in a plurality of subcarriers within the RBs associated with TCI state 1 with frequency density 1, and transmit another set of PT-RSs in a plurality of subcarriers within the RBs associated with TCI state 2 with frequency density 2.

In another embodiment of the present disclosure, the at least one transmitter 901 may transmit a set of PT-RSs in a plurality of OFDM symbols associated with TCI state 1 with a time density, and transmit another set of PT-RSs in a plurality of OFDM symbols associated with TCI state 2 with the time density.

In an embodiment of the present disclosure, the apparatus may also include at least one processor 905 coupled to the at least one transmitter 901 and receiver 903. The apparatus 900 may also include at least one non-transitory computer-readable memory 907, which can store computer executable instructions. The computer executable instructions can be programmed to implement a method with the at least one receiver 903, the at least one transmitter 901 and the at least one processor 905 so that carry out the method performed by the base station side apparatus according to various embodiments of the present disclosure.

Figure 10:
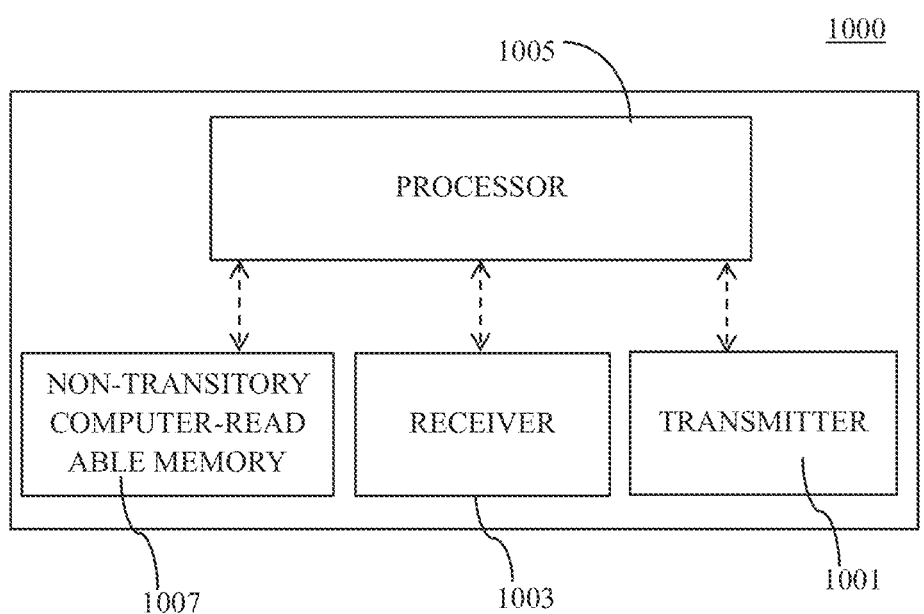
FIG. 10 is a schematic block diagram illustrating another exemplary apparatus according to an embodiment of the present disclosure.

FIG. 10 is a schematic block diagram illustrating an exemplary apparatus 1000 according to an embodiment of the present disclosure. In some embodiments of the present disclosure, the apparatus 1000 may be the UE as above discussed. The apparatus 1000 may perform the method as shown in FIG. 4 and FIG. 7.

Referring to FIG. 10, the apparatus 1000 may include at least one receiver 1003. The at least one receiver 1003 may receive a set of PT-RSs in a plurality of subcarriers within the RBs associated with TCI state 1 with frequency density 1, and receives another set of PT-RSs in a plurality of subcarriers within the RBs associated with TCI state 2 with frequency density 2.

In another embodiment of the present disclosure, the at least one receiver 1003 may receive a set of PT-RSs in a plurality of OFDM symbols associated with TCI state 1 with a time density, and receive another set of PT-RSs in a plurality of OFDM symbols associated with TCI state 2 with the time density.

In yet another embodiment of the present disclosure, the apparatus 1000 may have at least one transmitter 1001. In an embodiment of the present disclosure, the apparatus may also include at least one processor 1005 coupled to the at least one receiver 1003 and transmitter 1001. The apparatus 1000 may also include at least one non-transitory computer-readable memory 1005, which can store computer executable instructions. The computer executable instructions can be programmed to implement a method with the at least one receiver 1003, the at least one transmitter 1001 and the at least one processor 1005 so that carry out the method performed by the UE according to various embodiments of the present disclosure.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the teens "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a base station, the method comprising:
    transmitting a first set of phase-tracking reference signals in a first plurality of subcarriers within a first resource block set associated with a first transmission configuration indication (TCI) state with a first frequency density; and
    transmitting a second set of phase-tracking reference signals in a second plurality of subcarriers within a second resource block set associated with a second TCI state with a second frequency density,
    wherein the first resource block set and the second resource block set are frequency division multiplexed in a time interval and a third resource block set composed of the first resource block set and the second resource block set is scheduled by a downlink control information (DCI), and wherein the first frequency density is determined by a total number of resource blocks in the first resource block set, and the second frequency density is determined by a total number of resource blocks in the second resource block set.

2. The method of claim 1, wherein the first TCI state and the second TCI state are indicated by a TCI field in the DCI.

3. The method of claim 1, wherein the first frequency density equals the second frequency density, and the frequency densities are determined by a total number of resource blocks in the third resource block set scheduled by the DCI, and wherein the total number of resource blocks scheduled by the DCI is a sum of the total number of resource blocks in the first resource block set and the total number of resource blocks in the second resource block set.

4. The method of claim 1, wherein the first frequency density equals the second frequency density, and the frequency densities are determined by a minimal number of resource blocks between the total number of resource blocks in the first resource block set and the total number of resource blocks in the second resource block set.

5. The method of claim 1, wherein the first frequency density equals the second frequency density, and the frequency densities are determined by a maximum number of resource blocks between the total number of resource blocks in the first resource block set and the total number of resource blocks in the second resource block set.

6. A base station for wireless communication, comprising:
    at least one memory; and
    at least one processor coupled with the at least one memory and configured to cause the base station to:
        transmit a first set of phase-tracking reference signals in a first plurality of subcarriers within a first resource block set associated with a first transmission configuration indication (TCI) state with a first frequency density; and
        transmit a second set of phase-tracking reference signals in a second plurality of subcarriers within a second resource block set associated with a second TCI state with a second frequency density,
        wherein the first resource block set and the second resource block set are frequency division multiplexed in a time interval, and a third resource block set composed of the first resource block set and the second resource block set is scheduled by a downlink control information (DCI), and wherein the first frequency density is determined by a total number of resource blocks in the first resource block set, and the second frequency density is determined a total number of resource blocks in the second resource block set.

7. A user equipment (UE) for wireless communication, comprising:
    at least one memory; and
    at least one processor coupled with the at least one memory and configured to cause the UE to:
        receive a first set of phase-tracking reference signals in a first plurality of subcarriers within a first resource block set associated with a first transmission configuration indication (TCI) state with a first frequency density; and
        receive a second set of phase-tracking reference signals in a second plurality of subcarriers within a second resource block set associated with a second TCI state with a second frequency density,
        wherein the first resource block set and the second resource block set are frequency division multiplexed in a time interval and a third resource block set composed of the first resource block set and the second resource block set is scheduled by a downlink control information (DCI), and wherein the first frequency density is determined by a total number of resource blocks in the first resource block set, and the second frequency density is determined by a total number of resource blocks in the second resource block set.

8. The base station of claim 6, wherein the first TCI state and the second TCI state are indicated by a TCI field in the DCI.

9. The base station of claim 6, wherein the first frequency density equals the second frequency density, and the frequency densities are determined by a total number of resource blocks in the third resource block set scheduled by the DCI, and wherein the total number of resource blocks scheduled by the DCI is a sum of the total number of resource blocks in the first resource block set and the total number of resource blocks in the second resource block set.

10. The base station of claim 6, wherein the first frequency density equals the second frequency density, and the frequency densities are determined by a minimal number of resource blocks between the total number of resource blocks in the first resource block set and the total number of resource blocks in the second resource block set.

11. The base station of claim 6, wherein the first frequency density equals the second frequency density, and the frequency densities are determined by a maximum number of resource blocks between the total number of resource blocks in the first resource block set and the total number of resource blocks in the second resource block set.

12. The base station of claim 6, wherein the at least one processor is configured to cause the base station to schedule the DCI for the third resource block set.

13. The UE of claim 7, wherein the first TCI state and the second TCI state are indicated by a TCI field in the DCI.

14. The UE of claim 7, wherein the first frequency density equals the second frequency density, and the frequency densities are determined by a total number of resource blocks in the third resource block set scheduled by the DCI, and wherein the total number of resource blocks scheduled by the DCI is a sum of the total number of resource blocks in the first resource block set and the total number of resource blocks in the second resource block set.

15. The UE of claim 7, wherein the first frequency density equals the second frequency density, and the frequency densities are determined by a minimal number of resource blocks between the total number of resource blocks in the first resource block set and the total number of resource blocks in the second resource block set.

16. The UE of claim 7, wherein the first frequency density equals the second frequency density, and the frequency densities are determined by a maximum number of resource blocks between the total number of resource blocks in the first resource block set and the total number of resource blocks in the second resource block set.

17. A processor for wireless communication, comprising:
at least one controller coupled with at least one memory and configured to cause the processor to:
transmit a first set of phase-tracking reference signals in a first plurality of subcarriers within a first resource block set associated with a first transmission configuration indication (TCI) state with a first frequency density; and
transmit a second set of phase-tracking reference signals in a second plurality of subcarriers within a second resource block set associated with a second TCI state with a second frequency density,
wherein the first resource block set and the second resource block set are frequency division multiplexed in a time interval, and a third resource block set composed of the first resource block set and the second resource block set is scheduled by a downlink control information (DCI), and wherein the first frequency density is determined by a total number of resource blocks in the first resource block set, and the second frequency density is determined by a total number of resource blocks in the second resource block set.

* * * * *